June 6, 1933.                J. J. JAKOSKY ET AL                    1,912,373
                        METHOD FOR PRODUCING CARBON BLACK
                    Filed Oct. 7, 1929            3 Sheets-Sheet 1
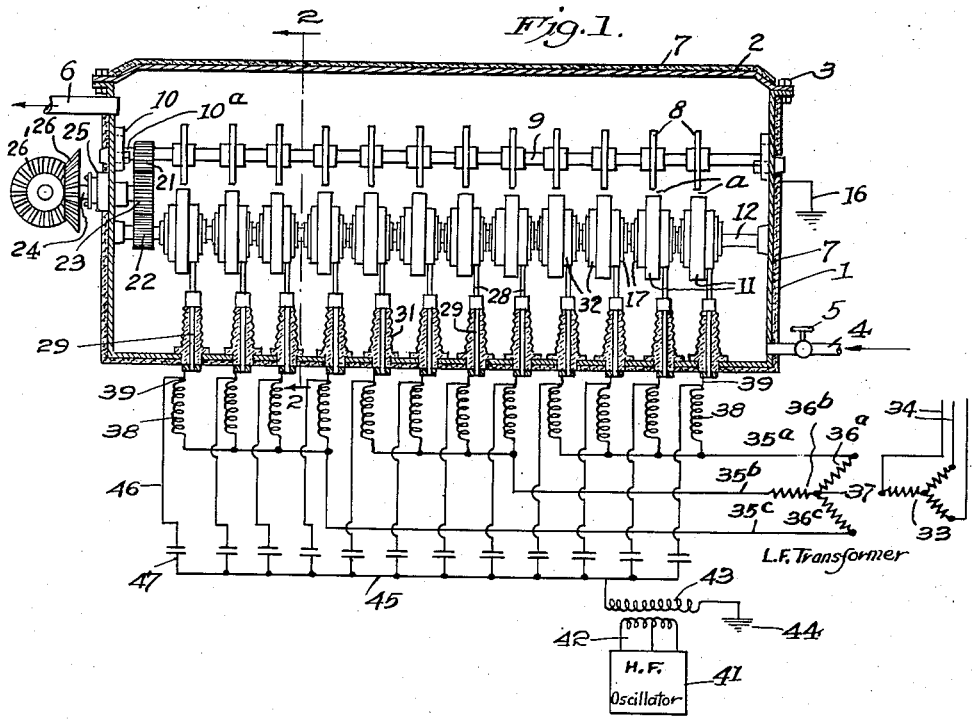
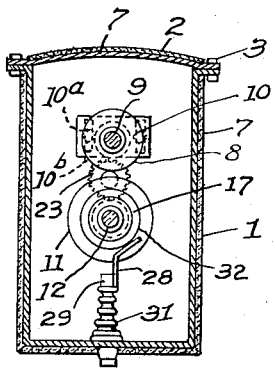
INVENTORS
John J. Jakosky
Victor F. Hanson
BY
ATTORNEYS

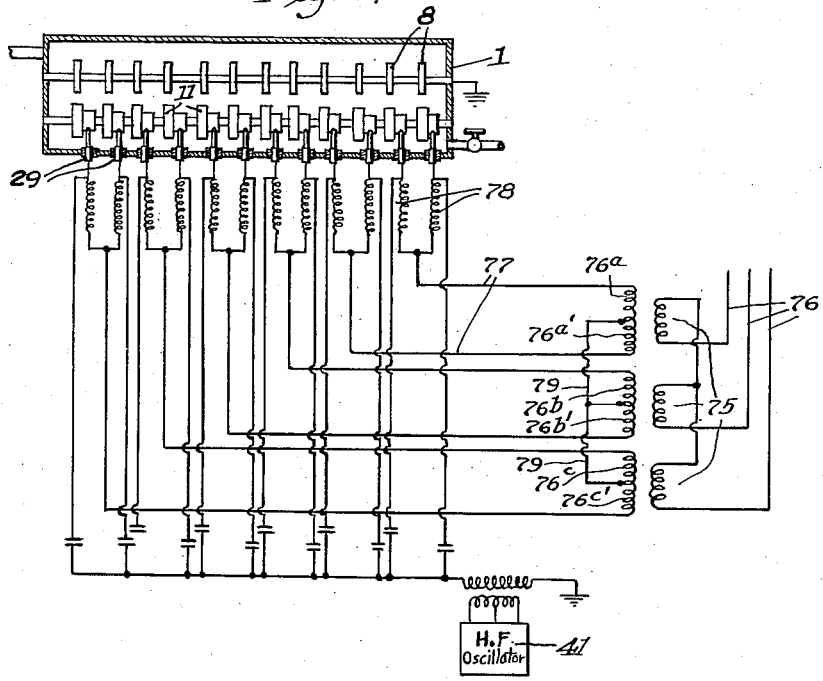
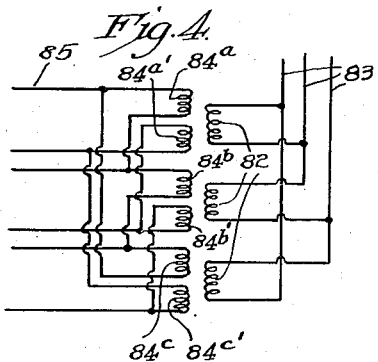

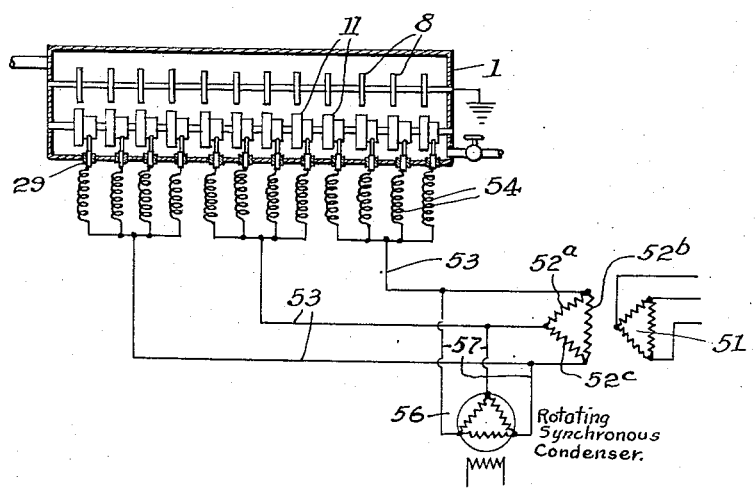
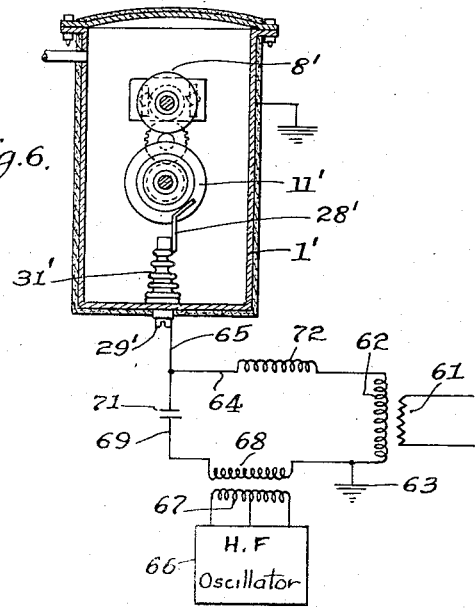

Patented June 6, 1933

1,912,373

UNITED STATES PATENT OFFICE

JOHN J. JAKOSKY AND VICTOR F. HANSON, OF LOS ANGELES, CALIFORNIA, ASSIGNORS TO ELECTROBLACKS INCORPORATED, OF CULVER CITY, CALIFORNIA, A CORPORATION OF NEVADA

METHOD FOR PRODUCING CARBON BLACK

Application filed October 7, 1929. Serial No. 397,841.

This invention relates to the production of carbon black and particularly to the production thereof by dissociation of a suitable liquid hydrocarbon or other carbon bearing oil by electrothermal means.

The principal objects of the invention are to provide for the maximum production of carbon black by this general method in an apparatus of a given size and to also provide for a maximum efficiency of utilization of electric power therein, that is, the production of a maximum quantity of carbon black for a given consumption of electric power. A further object of the invention is to provide the above high capacity and high efficiency without deleteriously affecting the quality of the carbon black produced.

An object of the invention is to disclose and provide a method of controlling the concentration of carbon-black in a body of carbon bearing oil so as to facilitate the formation of carbon-black therein by electrothermal dissociation.

Another object is to disclose and provide a method of facilitating and rendering more economic the production of carbon-black from a carbon bearing oil by electrothermal dissociation.

A still further object is to disclose and provide a method of producing carbon-black by electrothermal dissociation of carbon bearing oil wherein the rate of supply and the rate of withdrawal of oil to and from a dissociation zone is regulated so as to maintain the concentration of carbon-black in suspension in said oil within certain limits.

According to the preferred embodiment of this invention, the concentration of carbon black in the body of oil surrounding the dissociating zone is maintained substantially at a certain advantageous value, and in general as high as it is possible to do without deleteriously affecting the quality of the carbon black produced, or without unduly decreasing the fluidity of the body undergoing dissociation.

Although any electrothermal dissociation means may be employed, the apparatus may advantageously comprise electrode means including a plurality of low tension electrodes electrically connected together, and a plurality of high tension electrodes insulated from the low tension electrodes, said electrodes defining arc gaps therebetween beneath the surface of a body of oil, and the respective high tension electrodes, or respective groups thereof, may be separately connected to the extremities of the several windings of a poly-phase transformer, said transformer windings being wholly free of electrical connection to the low tension electrodes other than through said arc gaps.

The electrothermal process of producing carbon black by dissociation is described in United States patent of John J. Jakosky No. 1,597,277, and the method comprises in general maintaining a localized high temperature zone by means of an electric arc beneath the surface of a body of carbon bearing oil, while maintaining the main body of oil at a relatively low temperature so as to cause rapid and practically instantaneous dissociation of a portion of such oil within or at the surface of the arc, in the form of carbon black and hydrogen or other gas, followed by substantially immediate withdrawal or dissemination of the products of dissociation from the arc into the surrounding body of relatively low temperature oil. This quickly cools the carbon to a temperature sufficiently low to prevent further changes in the properties thereof, so that it remains substantially in the finely divided and unagglomerated condition in which it is first formed. The carbon black produced in this manner is, therefore, extremely finely divided and suitable for use in many ways in which its fine state of subdivision is advantageous. Furthermore, the carbon black so produced has a high tinting strength and is otherwise well adapted for use in the manufacture of inks or pigments.

The present invention is directed to the same general method and the carbon black produced thereby has the same advantageous properties as above mentioned.

The accompanying drawings illustrate apparatus particularly adapted for use in accordance with this invention and referring thereto:

Fig. 1 is a longitudinal vertical section of a reaction chamber provided with a plurality of low tension and high tension electrodes beneath the surface of the body of oil therein, with the connections of said electrode means to a source of electric power at low frequency and to a source of high frequency alternating current shown diagrammatically.

Fig. 2 is a transverse section on line 2—2 in Fig. 1.

Fig. 3 is a diagrammatic view similar to Fig. 1, showing the connection of the electrodes to a six phase power supply.

Fig. 4 is a wiring diagram of another form of six phase power supply means which may be used in place of that shown in Fig. 5.

Fig. 5 is another diagrammatic view similar to Fig. 1, showing a modified arrangement for connecting the electrodes to the power supply, without the provision of any high frequency current supply.

Fig. 6 is a vertical section of an apparatus provided with a single pair of electrodes, showing the connection thereof to a source of electric power at low frequency and to a source of high frequency alternating current.

The apparatus shown in Figs. 1 and 2 comprises a reaction vessel or chamber 1 provided with a cover 2 secured thereto in any suitable manner as, for example, by means of bolts 3 so as to make a fluid tight fit. A pipe 4 provided with valve 5 leads into the lower portion of chamber 1 for supplying carbon bearing oil thereto, and a pipe 6 leads from the upper portion of said chamber for conducting away the products formed therein. The inlet and outlet pipes 4 and 6 are preferably connected at opposite ends of the chamber 1, as shown. Chamber 1 and cover 2 may be provided with a covering of heat insulating material indicated at 7.

The electrode means are shown as comprising a series of disc shaped low tension electrode elements 8, mounted in spaced arrangement upon a shaft 9 rotatably mounted in vertically adjustable bearing means 10 on the end walls of the chamber, and a corresponding series of disc shaped high tension electrode elements 11 mounted opposite the respective elements 8 and in similarly spaced arrangement upon a shaft 12 parallel to shaft 9 and rotatably mounted in bearing means 13 on the end walls. Vertical adjustment of bearing means 10, for the purpose of adjusting the length of arc gap between opposing electrode elements, may be provided by means of bolts 10a passing through vertical slots 10b in said bearing means. An arc gap is thus provided between each pair of opposing electrode elements and the length of said arc gap may be adjusted so as to maintain said arc gap of proper length in spite of wearing away of the surfaces of the electrode elements. The low tension electrode elements 8 are electrically connected together, and preferably to the ground, by mounting the same directly upon shaft 9 and in electrical connection therewith, and by grounding said shaft in any suitable manner, as, for example, through the walls of the chamber as shown at 16.

The high tension electrode elements 11, on the other hand, are shown as electrically insulated from one another and from the low tension electrodes by mounting the same on insulating bushings 17 on shaft 12. The electrical connection to the respective high tension electrode elements 11 is made by means of brushes 28 connected to binding posts 29 extending through insulating bushings 31, said brushes engaging contact rings 32 secured between the respective electrode elements 11 and their insulating bushings 17. The outer ends of the respective binding posts 29 may be connected to suitable means for supplying electric current thereto at sufficient voltage to maintain arcs beneath the surface of the oil and between the respective electrode members.

The electrode elements 8 and 11 may be formed of carbon or other suitable material in the usual manner of arcing electrodes. Shafts 9 and 12 may be rotated in any suitable manner. For this purpose said shafts may be provided with gears or pinions 21 and 22 meshing with a driving gear 23 mounted on shaft 24 extending through a stuffing box 25 at one end of the chamber. The shaft 24 may be driven in any suitable manner at the desired speed, for example, through gear means 26 and 26'. The teeth of gears 21 and 23 may be made deep enough to permit the necessary vertical movement of said gears in adjusting shafts 9 and 12 and the electrode elements carried thereby toward or away from one another.

In Fig. 1 we have shown a wiring diagram of an advantageous means of electric power supply for the high tension electrodes. The main power supply is shown as comprising a Y-wound three phase transformer whose primary windings 33 may be connected to three phase power supply lines 34. In this particular case we have shown twelve pairs of electrode elements, and said elements may advantageously be arranged in groups corresponding to the several phases of the power supply system. Thus, in this case, the electrode elements are arranged in three groups each comprising four pairs of electrode elements. The binding posts 29 corresponding to the high tension electrode elements 11 of one group are connected through branch wires 39 and wire 35a to one of the secondary windings 36a of said transformer, while the binding posts 29 for the high tension electrode elements of the other two groups are similarly connected by separate branch wires to wires 35b and 35c leading to the other secondary windings 36b and 36c respectively. The common or neutral point 37 of the secondary windings of the transformer is shown as free from connection to the ground, and there is, hence, no electrical connection of the transformer to the low tension electrodes other than through the arc gaps between the electrodes. The secondary voltage of said transformer may be any voltage suitable for the maintenance of arcs between the respective electrode elements for the formation of carbon black according to the methods outlined above; for example, said secondary voltage may be from 500 volts to 2500 volts or more. An impedance is preferably included in the connection from each binding post to the wire leading to the transformer so as to prevent the first arc formed in any group of electrode elements from drawing an excessive current and lowering the voltage on the line to such a point as to prevent establishment of the other arcs in said group. These separate impedance means in the branch connections to the respective high tension electrode elements are shown as comprising inductance elements 38 connected in the respective branch wires 39 leading from the wires 35a, 35b and 35c to the individual binding posts 29.

It will be understood that the power supply means above described, including the transformer, is intended to operate at the ordinary low frequency of commercial power supply systems. However, in order to maintain arcing between the electrodes and keep the intervening medium in an ionized condition and thus facilitate passage of the main current upon each pulsation of the low frequency power supply, we prefer to also connect the respective electrode elements to a suitable source of high frequency current. Such source of high frequency current is shown as comprising a high frequency oscillator 41 of any suitable or well known construction, whose output coil 42 is linked with coil 43. One end of the coil 43 is connected to the low tension electrodes, for example, by being grounded as indicated at 44, while the other end thereof is connected through wire 45 and individual branch wires 46 to the respective binding posts 29 for the several high tension electrodes. As each branch wire 46 is connected at the opposite side of the corresponding inductance element 38 from the low frequency supply, each of said inductance elements is adapted to act as a high frequency choke and prevent the high frequency current from reaching the transformer. A blocking condenser 47 is also connected in each of the branch wires 46 to prevent the low frequency current from reaching coil 43 and to also prevent short circuiting of the transformer windings through said branch wires.

The production of carbon black is carried out in the above described apparatus as follows: The oil to be treated is delivered to the reaction chamber 1 and a body of such oil is maintained within said chamber up to a level above the arcs between the opposing electrode elements. The valve 5 may be so adjusted as to cause the oil to enter at the desired rate and the products may be continually withdrawn through outlet pipe 6, the products so withdrawn being in general accompanied by a certain proportion of undissociated oil overflowing through the outlet pipe. The electrode elements 8 and 11 are set in rotation at a suitable speed and both the low frequency power supply and the high frequency apparatus set in operation so as to maintain a series of arcs between the opposing faces of the several electrode elements.

The high frequency current flow between the opposing electrode faces maintains a high frequency arc through the oil, it being understood that the high frequency of this current enables such arc to be maintained without excessive potential difference and with only a relatively small flow of current, which is just sufficient to maintain the oil in an ionized state without affecting any appreciable dissociation thereof and with the consumption of only a very small amount of power. The ionized condition of the oil, however, permits the initial passage of the low frequency current at a much lower potential difference than would be required to initiate an arc in the absence of such ionized condition, so that a lower secondary voltage is required on the low frequency transformer than would otherwise be the case. When low frequency current alone is utilized, the so-called striking voltage, that is, the voltage required to initiate the arc, is much higher than the voltage required to maintain the desired current flow across the arc after it has once been found, and for this reason it is necessary to use a transformer having a secondary voltage much higher than the voltage actually utilized in the arc and it is also necessary to use impedance, located at the branch connections to the respective electrode elements, in the same manner as the impedance elements 38 above described, but of much larger value in order to prevent the passage of excessive current through the arc after it has been initiated. The utilization of high frequency current for maintaining an arc of low power consumption is, therefore, of advantage in that it permits the utilization of a transformer having a lower secondary voltage and also a greater reduction in size of impedances required in series with the respective arcs. A great deal higher efficiency of utilization of the low frequency current is thus obtained.

A further advantageous feature of the above arrangement is that there is no direct return connection, through the ground or otherwise, from the low tension electrodes to the transformer windings, so that a complete circuit from any transformer winding can be completed only through two arcs in series. Furthermore, there will always be at least two phases of the transformer in series with each arc gap, so that the applied voltage across each arc gap at any time will be the vector sum of the voltages in these two phases and the time at which such applied voltage drops to zero will be reduced to once per cycle instead of twice per cycle as would be the case if the common or neutral point of the transformer were grounded so as to place only one phase in series with each arc gap. The arc is thus maintained during a greater proportion of the total time than would otherwise be the case, and a higher production of carbon black per arc gap is the result.

The arcs formed as above described provide a plurality of comparatively restricted high temperature dissociation zones, as at $a$, surrounded by the relatively large body of oil at a materially lower temperature than the temperature of such dissociation zones. The electrode elements 8 and 11 are adjusted as above described so as to give the desired length of arc gap, and such adjustment may be repeated whenever necessary, due to gradually wearing away or consumption of the surfaces of the electrode elements.

The high temperature in the dissociation zones causes the oil in and immediately surrounding each of said zones to be dissociated principally into carbon and hydrogen (together with small amounts of methane and light unsaturated gases). Due to the rotation of the electrode elements a fresh supply of oil is continually drawn into the dissociation zones and the products of dissociation are disseminated, substantially immediately upon their formation, into the surrounding body of relatively low temperature oil. This movement of fresh oil toward the dissociation zones and of the reaction products out of the dissociation zones is also assisted by the convection currents produced in the body of oil due to heating the oil around the dissociation zones, and also by the agitation of the oil due to the escape of hydrogen and other gases upwardly therethrough from said dissociation zones.

The temperature in the dissociation zones is relatively high, for example from about 2,000° to 3,000° F., while the temperature of the oil immediately surrounding such zones is much lower than this, as substantially the same temperature prevails throughout the entire body of oil outside the dissociation zones due to the continual agitation and circulation of such oil. A steep temperature gradient is thus provided between the oil and the arcs, and the actual dissociation, therefore, takes place only in the arcs or at the surface of the oil around the arcs or throughout a very thin layer immediately surrounding the same.

The hydrogen and other gases produced by the resulting dissociation of oil at the surface of the arcs passes upwardly through the body of oil to the top of the chamber and hence out through pipe 6. The carbon black formed at the surface of the dissociation zones is immediately disseminated into the relatively low temperature oil surrounding the same and is retained in suspension in such oil. The carbon black so formed will accumulate to a certain extent in the oil within the reaction chamber, but the presence of such carbon black in the oil does not hinder in any way the dissociation of further quantities of the oil to form additional carbon black.

According to the present invention we prefer to supply the oil at such a rate that a continual overflow of undissociated oil, with carbon black in suspension therein, passes out through outlet pipe 6 along with the gases or vapors, while the average concentration of carbon black in suspension in the body of oil within the reaction chamber is maintained at such a value as to provide maximum efficiency of production of carbon black without deleteriously affecting the quality thereof. We have found that within certain limits, an increase in concentration of carbon black in suspension in the oil not only enables a greater passage of current in the arcs and a consequent increase in power input, but also actually increases the efficiency of utilization of this power in dissociating the oil and producing carbon black. The capacity of the apparatus is thus increased by such increase in concentration, for two reasons, namely, increased power input and increased efficiency of power utilization. There is, of course, an upper limit beyond which it is undesirable to increase the concentration of carbon black in the oil, not only because the resulting mixture becomes too thick for satisfactory operation, but also because there appears to be some diminution of the quality of the carbon black produced at excessive concentrations. In general we have found it advantageous from the standpoint of increased efficiency of utilization of power and equipment to maintain the concentration of carbon black in the reaction chamber above 5%, and in order to maintain the highest quality of the product, to maintain such concentration below 15%. The most advantageous concentration, in the case of certain oils at least, such as gas oil and Diesel oil, has been found to lie between 8 and 10%.

The products withdrawn through pipes 6 may be delivered to suitable means such as a separating trap for separating the gaseous products from the suspension of carbon black in oil, and such suspension may then be used either for the production of printing ink or for any other purpose, or the carbon black may be separated from the oil, as by settling, centrifuging or filtering for the formation of substantially dry carbon black which may then be utilized for any desired purpose, such as the production of high grade inks, the compounding of rubber, etc.

In Figs. 3 and 4 we have illustrated the connection of the apparatus to six phase power supply means, which is particularly advantageous in that it increases the number of phases connected in circuit with each arc gap and thus produces smoother operation. The reaction chamber 1 in Fig. 3, and the electrode means 8 and 11 therein, are substantially the same as in Fig. 1. The power supply in this case, however, is shown as comprising a double Y-wound transformer having three primary windings 75 connected to three-phase power supply lines 76, and three double Y-wound secondary windings indicated at 76a, 76a', 76b, 76b', 76c and 76c'. The extremities of the several secondary windings are connected by wires 77 to the binding posts 29 for the high tension electrode elements 11. In this case, however, only two high tension electrodes are connected in parallel to each wire 77, a separate inductance element 78 being as before connected in the branch connection to each of said binding posts. The mid-point between the two halves of each double secondary winding are electrically connected as by means of wires 79, in the same manner as the common or neutral terminals 37 of the three phase transformer of Fig. 1, and these neutral points are, as before, free from connection to the ground and hence free from electrical connection to the low tension electrodes other than through the arc gaps. We have also shown the system as including high frequency current supply means 41, connected to the respective electrode elements in substantially the same manner as shown in Fig. 1.

In this case each arc gap is connected in circuit not only with the secondary phase to which the corresponding high tension electrode is directly connected, but also through each arc gap of each of the other groups with the respective secondary phases connected to said groups, so that there will at all times be a potential difference across said arc gap resulting in practically steady operation or materially reducing the ratio of the time during which the arc is not operating to the time during which it is operating.

Fig. 4 illustrates how a double delta-wound transformer having a three-phase primary and a six-phase secondary may be used in the same manner as the Y-wound transformer shown in Fig. 3. The transformer comprises three primary phases 82 connected to three-phase power supply lines 83 in the usual manner of delta-wound transformers, and secondary windings, 84a, 84a', 84b, 84b', 84c and 84c', connected together in double delta arrangement. The extremities of the several secondary windings may be connected by wires 85 to the binding posts of the high tension electrodes, each of said wires leading to two of said binding posts in parallel, in the same manner as the wires 77 in Fig. 3. The entire system may be otherwise the same as shown in Fig. 3 and the same advantages are realized in operation.

The reaction chamber 1 shown diagrammatically in Fig. 5, and the electrode means 8 and 11 therein, are also substantially the same as in Fig. 1. The power supply in this case, however, is shown as comprising a delta-wound three-phase transformer having primary windings 51 and secondary windings 52a, 52b, and 52c. The three points of connection of the several windings are connected by wires 53 to the binding posts 29 for the high tension electrodes 11, each of said wires being connected to the binding posts of four of said electrodes, as in Fig. 1, and a separate inductance element 54 is connected in the branch connection to each binding post. As before, the secondary windings of the transformer are entirely free from electrical connection to the low tension electrodes other than through the arc gaps. We have shown no means for supplying high frequency current in this case, although it will of course be understood that, if desired, high frequency supply means, such as shown in Fig. 1, may also be connected in similar manner to the apparatus shown in Fig. 5.

In order to improve the power factor of the apparatus as a whole, suitable capacity means may be connected to the leads 53 from the transformer to the high tension electrodes. Such capacity means is shown, for example, as comprising a rotating synchronous condenser 56, which consists of an over-excited synchronous motor acting as a condenser, connected to leads 53 by wires 57. It will be understood however, that other means, such as a static power-factor-correcting condenser, may also be employed for this purpose.

The operation of this form of the invention is substantially the same as above described, with the exception that there is no high frequency arc produced, and the transformer secondary voltage must, therefore, be high enough to overcome the resistance of the oil between the electrodes and initiate an arc, while the inductance elements 54 must have sufficient impedance to permit only the desired current flow across each arc after it has once been formed. As in the previous case, a circuit for any phase of the transformer can be completed only through two arcs in series, and each arc gap is in circuit with two phases of the transformer, so that the applied voltage across each arc will drop to zero only once during each cycle.

The apparatus shown in Fig. 6 comprises only a single high tension electrode 11' and a single grounded electrode 8', mounted within a reaction chamber 1'. Said electrodes are rotatably mounted within the chamber in substantially the same manner as the electrodes 8 and 11 above described, and the high tension electrode shown as supplied with a contact brush 28' connected to a binding post 29' extending through an insulated bushing 31'. The main power supply means is shown as comprising a single phase transformer having primary winding 61 connected to a source of low frequency, low voltage power supply and a secondary winding 62, one side of which is grounded as indicated at 63 and the other side of which is connected by wires 64 and 65 to binding post 29'. A high frequency oscillator or other source of high frequency current, indicated at 66, has its output coil 67 linked to a coil 68. One end of said coil 68 is also grounded, for example by connection to the ground connection 63, while the other side of said coil is connected through wire 69 to the wire 65 leading to binding post 29'. A blocking condenser 71 is provided in wire 69, for preventing passage of the low frequency current from the transformer through the coil 68, while a high frequency choke 72 is provided in wire 64, the combined inductance of said choke and of the transformer secondary 62 serving to prevent passage of the high frequency current through the branch of the circuit including said choke and transformer winding.

This form of apparatus also operates in substantially the same manner as above described, with the exception that there is only one pair of electrodes and consequently only one zone of arcing within the body of oil in the reaction chamber. Since the low frequency power supply is only single phase, the voltage across the arc gap will of course drop to zero twice during each cycle in this form of the invention. However, as in the apparatus shown in Figs. 1 and 2, the high frequency voltage between the electrodes will maintain a high frequency arc therebetween, of small or negligible power consumption but sufficient to keep the oil in an ionized state and permit the low frequency power arc to be formed without requiring a voltage much in excess of that required to maintain the arc after it has been formed. This form of apparatus therefore illustrates, in its simplest embodiment, the combined use of high frequency and low frequency voltages across the arc gap in a process such as above described.

We claim:

1. The method of producing carbon black which comprises supplying carbon bearing oil to a suitable container and maintaining a body of such oil in said container, establishing an electric arc beneath the surface of said body of oil so as to cause dissociation of a portion of the oil and formation of carbon black, permitting the carbon black so formed to accumulate in suspension in said body of oil, and withdrawing portions of the undissociated oil containing such carbon black in suspension therein, the rates of supply and withdrawal being so regulated as to maintain the concentration of carbon black in suspension in the body of oil surrounding said electric arc between 5% and 15%.

2. The method of producing carbon black which comprises supplying carbon bearing oil to a suitable container and maintaining a body of such oil in said container, establishing an electric arc beneath the surface of said body of oil so as to cause dissociation of a portion of the oil and formation of carbon black, permitting the carbon black so formed to accumulate in suspension in said body of oil, and withdrawing portions of the undissociated oil containing such carbon black in suspension therein, the rates of supply and withdrawal being so regulated as to maintain the concentration of carbon black in suspension in the body of oil surrounding said electric arc between 8% and 10%.

3. In a process of producing carbon-black by dissociation of carbon bearing oil by means of an electric arc maintained in contact with said oil, the step of maintaining a concentration of between 5% and 15% of carbon-black in the oil being dissociated.

4. In a process of producing carbon-black by dissociation of carbon bearing oil by means of an electric arc maintained in contact with said oil, the step of maintaining a concentration of between 8% and 10% of carbon-black in the oil being dissociated.

5. In a process of producing carbon-black by dissociation of a carbon bearing oil by means of an electric arc maintained in contact with said oil, the steps which comprise circulating said oil so as to bring the same into and out of contact with said electric arc and supplying additional carbon bearing oil to the oil being circulated at such rate as to maintain a concentration of between 5% and 15% of carbon-black in said oil.

6. In a process of producing carbon-black by electro-thermal dissociation of carbon bearing oil, the step of maintaining a concentration of between 5% and 15% of carbon-black in the oil being dissociated.

7. In a process of producing carbon-black by electro-thermal dissociation of carbon bearing oil, the step of maintaining a concentration of carbon-black in the oil being dissociated in excess of 5% and sufficiently low to maintain sufficient fluidity in the mixture for satisfactory operation.

In testimony whereof we have hereunto subscribed our names this 24th day of September 1929.

JOHN J. JAKOSKY.
VICTOR F. HANSON.